United States Patent [19]
Morin et al.

[11] Patent Number: 6,032,591
[45] Date of Patent: Mar. 7, 2000

[54] SYSTEM FOR RECYCLING REFUSE

[75] Inventors: Jean-Xavier Morin, Neuville Aux Bois; Jean-Pierre Peyrelongue, Pontchartrain, both of France

[73] Assignee: Gec Alsthom Stein Industrie, Velizy-Villacoublay, France

[21] Appl. No.: 09/015,533

[22] Filed: Jan. 29, 1998

[30] Foreign Application Priority Data

Jan. 30, 1997 [FR] France .................................. 97 00993

[51] Int. Cl.⁷ .............................. F23G 5/02; F23G 5/30
[52] U.S. Cl. ..................... 110/220; 110/222; 110/219; 110/234; 110/245
[58] Field of Search .................................. 110/203, 234, 110/233, 218, 219, 220, 222, 243, 244, 245, 224, 227, 346

[56] References Cited

U.S. PATENT DOCUMENTS

| | | | |
|---|---|---|---|
| 4,155,313 | 5/1979 | Moss .................................. | 110/220 X |
| 4,253,405 | 3/1981 | Cottrell et al. .......................... | 110/222 |
| 4,421,038 | 12/1983 | Goldbach et al. .................. | 110/220 X |
| 4,977,837 | 12/1990 | Roos et al. . | |
| 5,316,736 | 5/1994 | Vidal et al. ......................... | 110/245 X |
| 5,345,884 | 9/1994 | Vandycke et al. .................. | 110/245 X |
| 5,425,317 | 6/1995 | Schaub et al. ...................... | 110/216 X |

FOREIGN PATENT DOCUMENTS

| | | |
|---|---|---|
| 2 716 524 A1 | 8/1995 | France . |
| 2 735 041 A1 | 12/1996 | France . |
| WO 96/20130 | 7/1996 | WIPO . |

OTHER PUBLICATIONS

H. Drescher, "Glasvermahlung Neue Wege Beimaltglasrecycling", SPRECHSAAL, vol. 128, No. 2, Mar. 1, 1995, pp. 10–15.

J. Scheffler et al, "Erzeugung Verwertbarer Produkte Durch Aufbereitung Und Verglasung Von Rostaschen Aus Der Mullverbrennung", ENTSORGUNGS PRAXIS, vol. 13, No. 12, Dec. 1, 1995, pp. 26–30.

*Primary Examiner*—Ira S. Lazarus
*Assistant Examiner*—Ljiljana V. Ciric
*Attorney, Agent, or Firm*—Sughrue, Mion, Zinn, Macpeak & Seas, PLLC

[57] ABSTRACT

A refuse recycling system which recycles municipal waste as energy, includes a shredder for shredding the waste and removing rejects via a feed pipe to a circulating fluidized bed reactor, the reactor producing flue gases. The reactor includes a side dense fluidized bed situated on the wall of the reactor which is provided with the feed pipe, the side dense fluidized bed extracting non-fluidizable heavy elements and transporting them to a coarse-particle sorter apparatus via an extraction duct disposed at a base of the side dense fluidized bed. At least a portion of the rejects from the shredder is fed into the coarse-particle sorter apparatus. The coarse-particle sorter apparatus cools the elements and extracts non-fluidizable inert matter from the elements, the remaining matter being fed back into the reactor. A module for recovering energy and for treating the flue gases output by said reactor is connected downstream from the reactor.

4 Claims, 1 Drawing Sheet

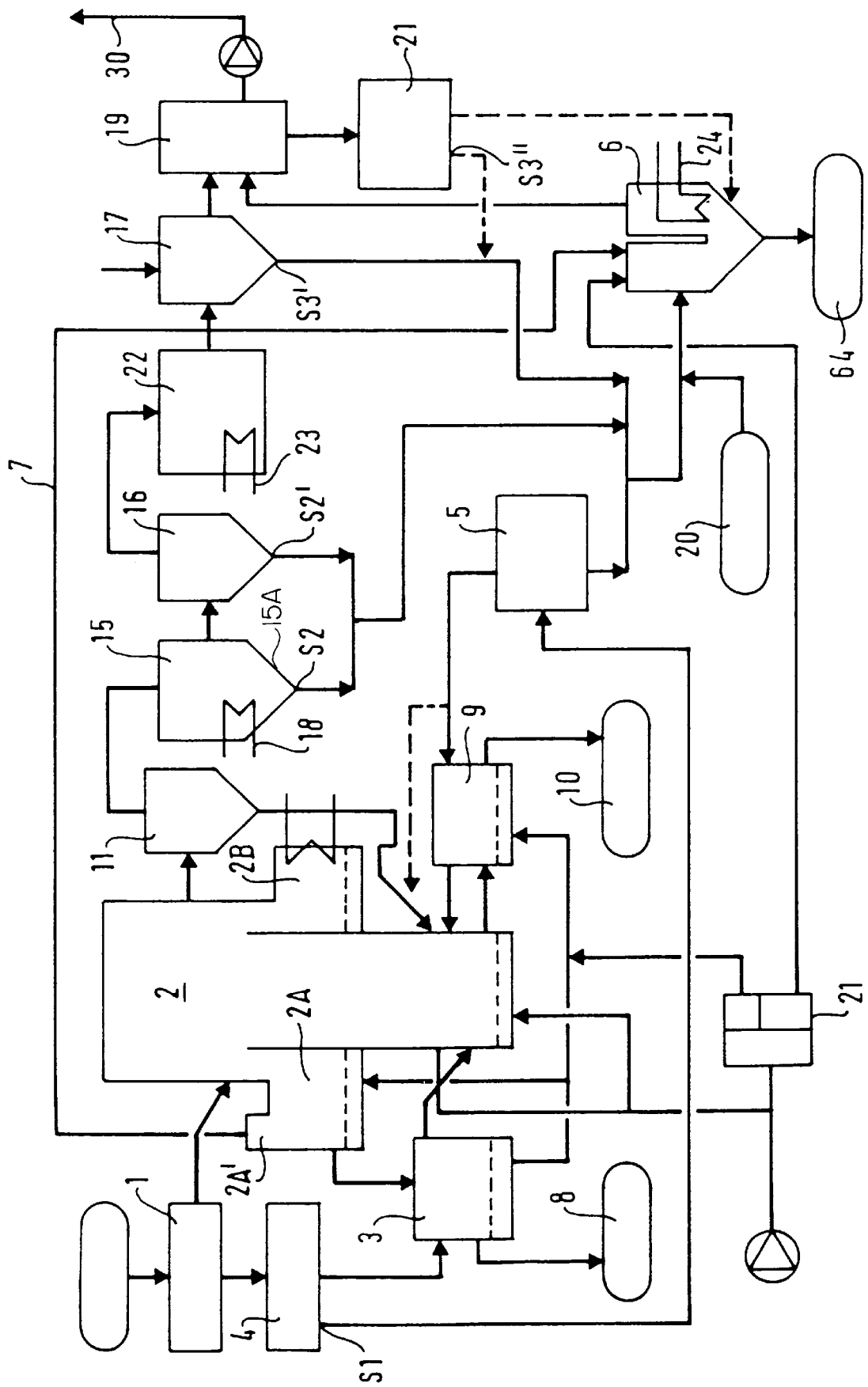

6,032,591

SYSTEM FOR RECYCLING REFUSE

The present invention relates to an installation for recycling municipal waste and the like as energy.

BACKGROUND OF THE INVENTION

Such a refuse recycling installation is described in Patent Document FR-2 735 041. It thus includes a first side dense fluidized bed situated on that wall of the reactor which is provided with the feed pipe via which the shredded waste is fed in, and where the shredded waste undergoes gasification, and a second side dense fluidized bed equipped with a superheater. An extraction duct via which the non-fluidizable heavy elements are extracted is situated at the base of the first side dense fluidized bed, and it conveys the heavy elements to a coarse-particle sorter apparatus that cools the elements and that extracts the non-fluidizable inert matter, the remaining matter being fed back into the reactor.

Furthermore, the rejects removed from the shredder apparatus must be treated if they are to made recyclable. They must be stored in Class 2 waste-storage sites, which constitutes costly treatment.

SUMMARY OF THE INVENTION

The present invention solves the above problem, and, to this end, according to the invention, at least a portion of the rejects is fed into the coarse-particle sorter apparatus.

The matter fed into the coarse-particle sorter is used to cool the non-fluidizable inert matter coming from the reactor. It is subjected to heat treatment at a temperature approximately in the range 400° C. to 500° C. to clean it by removing the organic matter from it, and to make it recyclable directly at the outlet of the coarse-particle sorter apparatus, without spending energy, and therefore without reducing the overall efficiency of the installation.

In a preferred embodiment, the installation includes a sorter apparatus in which the rejects are sorted into a first stream of inert matter that is hardly polluted with organic matter, and into a second stream of inert matter that is more heavily polluted with organic matter or with combustible heavy elements.

In this case, the first stream of inert matter is advantageously fed into the coarse-particle sorter apparatus.

Advantageously:

the reactor is provided with a fine-particle sorter apparatus connected to its base;

the installation includes a sifting shredder into which the second stream is fed; and the fine particles produced by the sifting shredder are fed into the fine-particle sorter apparatus.

These fine particles contain an organic portion which can be used for combustion of the fluidizable inert matter, and their inert matter content makes it possible to reduce the consumption of sand serving as the main component in the reactor 2. In the fine-particle sorter, they are subjected to heat treatment so as to clean them and make them recyclable as clinker.

BRIEF DESCRIPTION OF THE DRAWING

The invention is described below in more detail with reference to the figure which merely shows a preferred embodiment of the invention, and in which:

The FIGURE is an overall view of an installation of the invention for recycling municipal waste.

DETAILED DESCRIPTION OF THE PREFERRED EMBODIMENTS

As shown in the FIGURE, the installation for recycling municipal waste and the like as energy includes a circulating fluidized bed reactor 2 receiving the waste in the shredded state. Preferably, this reactor is of the type described in Patent Document FR- 2 735 041. It thus includes a first side dense fluidized bed 2A situated on that wall of the reactor which is provided with the feed pipe via which the shredded waste is fed in, and where the shredded waste undergoes gasification, and a second side dense fluidized bed 2B equipped with a superheater. An extraction duct via which the non-fluidizable heavy elements are extracted is situated at the base of the first side dense fluidized bed 2A, and it conveys the heavy elements to a coarse-particle sorter apparatus 3 that cools the elements and that extracts the non-fluidizable inert matter, the remaining matter being fed back into the reactor 2.

Upstream from the reactor 2, the raw waste is inserted into preparation apparatus 1 firstly shredding the waste, e.g. by means of a shearing module comprising one or two rotary shears, and secondly removing the inert matter and the matter that is likely to agglomerate (ferrous metals, non-ferrous metals, pebbles, glass) e.g. by means of magnetic and induction separators and/or of tumbler drums depending on the type of waste to be treated.

The shredded waste is inserted into the reactor 2 and the rejects are sorted into two streams in sorter apparatus 4 preferably constituted by gravity classifiers or air classifiers.

A first stream of inert matter that is little polluted with organic matter (glass, pebbles, solid scrap metal) is inserted into the coarse-particle sorter apparatus 3, where, mixed with hot matter coming from the reactor 2 and used to cool the non-fluidizable inert matter coming from the reactor 2, it is subjected to heat treatment or "heat cleaning" at a temperature approximately in the range 400° C. to 500° C. to remove the organic matter.

Using the coarse-particle sorter apparatus 3, a stream of solid residue 8 is thus obtained composed of matter which is inert and/or of large size (stones, glass, ceramic, scrap metal), which is only slightly oxidized and from which the organic and slightly oxidized matter has been removed, thereby facilitating recycling of the residue.

A second stream of inert matter polluted with organic matter or with combustible heavy elements, whose carbon content is greater than 5%, and therefore that cannot be recycled directly, is removed via a first outlet S1 from which it is inserted into a sifting shredder 5 installed on a controlled pipe leading to a melting and vitrification furnace 6.

The first internal dense bed 2A is provided with a chamber for tapping off the pyrolitic gas 2A' which is injected into the melting and vitrification furnace 6 via a pipe 7 separate from the main stream of combustion gases.

The reactor 2 is also provided with fine-particle sorter apparatus 9 enabling ash to be separated out at the bottom of the reactor 2 and enabling solid particles whose grain-size is compatible with fluidization to be re-circulated into the reactor. This apparatus 9 is also used to re-inject fine particles coming from the sifting shredder 5. These fine particles still contain an organic portion which can be used for combustion of the fluidizable inert matter, and their inert matter content reduces the consumption of sand serving as the main component in the reactor 2. Putting these fine rejects through the fine-particle sorter apparatus, also enables them to be heat cleaned of the non-fluidizable elements. The recyclable clinker 10 is removed from the fine-particle sorter apparatus 9.

The quality of the rejects is thus improved by them being put through coarse-particle sorter apparatus 3 and fine-particle sorter apparatus 9, the apparatus being associated with the reactor 2. It is thus not necessary to store them in Class 2 waste-storage sites.

Downstream from the reactor 2, the flue gases circulate through the following:

a cyclone 11 for separating out the solids;

a recuperator boiler 15 into which the gases output by the cyclone 11 are discharged, and which is equipped with a first set of heat exchangers 18, and more precisely with an evaporator, the boiler including a dust-filter hopper 15A from which the solid particles are removed via a second outlet S2;

a second cyclone 16 for hot-filtering the flue gases from which solid particles are removed via an outlet S2';

a second set of heat exchangers 23, and more precisely an economizer, disposed in a chamber 22 into which the gases are fed; and final treatment apparatus in which the solid matter resulting from the treatment is removed from the gases via a third outlet S3' and S3".

More precisely, the final treatment apparatus comprises a filter 17, preferably a sleeve filter, provided with an inlet via which activated carbon can be injected, and from which the solid particles are removed via an outlet S3', and a flue-gas scrubber module 19 from which a scrubber cake is removed via an outlet S3", the cleaned flue gases being removed via a flue 30.

The scrubber apparatus 19 is provided with apparatus 21 for treating the liquid effluents.

All of the above-described outlets S1' to S3" are connected by controlled pipes to the melting and vitrification furnace 6 which is independent from the above-described main line of the installation.

In this apparatus 6, the melting energy is supplied by the pyrolitic gas taken from the fluidizing bed 2A, and optionally by feeding in plastics waste 20 that can come from packaging recycling, the rejects (soiled packaging) of which contain considerable heat energy. The oxidant of the melting furnace 6 is air or air enriched with oxygen, depending on the desired temperature. When the air is enriched with oxygen, it is supplied by a diaphragm unit 21, and the fraction that has had its oxygen content reduced is then used for fluidizing the sorter apparatus 3 and 9 and the fluidized-bed reactor 2.

The grain size of the fly ash coming from the outlet S2 of the recuperator boiler 15, from the outlet S2' of the cyclone 16, and from the outlet S3" of the filter 17, and the grain size of the scrubber cake 19 coming from outlet S3" of the scrubber apparatus 19 enable this matter to be injected directly into the melting and vitrification furnace 6. However, the rejects from the sorter apparatus 4 for preparing the waste are of grain size that varies widely and that may be large. It is therefore necessary to provide the sifting shredder 5 between the outlet S1 and the melting and vitrification furnace 6.

The melting and vitrification furnace 6 may be designed differently depending on the quantities of matter to be treated, and on the degree of melting required.

It may be of the type described in Patent Document FR-2 716 524, in which case the two fractions to be vitrified can be melted in a controlled and separate manner, the two fractions being the coarse fraction coming from the rejects and whose heavy-metal concentration is generally low, and the fraction in powder form coming from extractions of more heavily polluted fly ash.

To compensate for evaporation, the water in the quenching bath of the melting and vitrification furnace 6 is topped up using rejects from the liquid effluent treatment apparatus 21, which makes it possible to adjust the pH of the bath and to improve heavy-metal insolubility.

Advantageously, a cooling circuit 24 removes heat energy from the vitrification bath to use it to heat up the boiler feed water.

What is claimed is:

1. An apparatus for recycling municipal waste as energy, the recycling apparatus comprising:

a shredder for shredding the waste, said shredder having a feed pipe via which rejects are removed;

a circulating fluidized bed reactor having at least one wall at which the feed pipe enters the reactor, the reactor receiving the shredded waste from the feed pipe and outputting flue gases, the reactor including:
        a side dense fluidized bed situated on the wall of the reactor which is provided with the feed pipe, the side dense fluidized bed which extracts non-fluidizable heavy elements, and
        an extraction duct disposed at a base of the side dense fluidized bed, via which the non-fluidizable heavy elements are extracted, a coarse-particle sorter apparatus to which the elements are transported from the side dense fluidized bed via the extraction duct, the coarse-particle sorter cooling the elements and extracting non-fluidizable inert matter from the elements, remaining any matter being fed back into the reactor; and a module connected downstream from said reactor, for recovering energy and for treating the flue gases output by said reactor;

wherein at least a portion of said rejects from the shredder is fed into said coarse-particle sorter apparatus.

2. The apparatus according to claim 1, further comprising another sorter apparatus disposed downstream from and connected to the shredder, in which said rejects are sorted into a first stream of inert matter that is substantially unpolluted with organic matter, and into a second stream of inert matter that is polluted with one of organic matter and combustible heavy elements.

3. The apparatus according to claim 2, wherein said first stream of inert matter is fed into said coarse-particle sorter apparatus from said sorter apparatus another.

4. An apparatus for recycling municipal waste as energy, the recycling apparatus comprising:

a shredder for shredding the waste and having a feed pipe via which rejects are removed;

a circulating fluidized bed reactor having at least one wall at which the feed pipe enters the reactor, the reactor receiving the shredded waste from the feed pipe and outputting flue gases, the reactor including:
        a side dense fluidized bed situated on the wall of the reactor which is provided with the feed pipe, the side dense fluidized bed which extracts non-fluidizable heavy elements, and
        an extraction duct disposed at a base of the side dense fluidized bed, the non-fluidizable heavy elements being extracted via said extraction duct, a coarse-particle sorter apparatus to which the elements are transported from the side dense fluidized bed via the extraction duct, the coarse-particle sorter cooling the elements and extracting non-fluidizable inert matter from the elements, remaining any matter being fed back into the reactor;

a module connected downstream from the reactor for recovering energy and for treating the flue gases output by said reactor;

wherein at least a portion of said rejects from the shredder is fed into said coarse-particle sorter apparatus;

another sorter apparatus disposed downstream from and connected to the shredder, said rejects being sorted by said another sorter into a first stream of inert matter that is substantially unpolluted with organic matter and into a second stream of inert matter that is polluted with one of organic matter and combustible heavy elements;

wherein said reactor includes a reactor base and said apparatus further comprises:
 a fine-particle sorter apparatus connected to the reactor base; and
 a sifting shredder into which said second stream is fed from said sorter another apparatus, said shredder producing fine particles, the fine particles produced by the sifting shredder being fed into the fine-particle sorter apparatus.

* * * * *